United States Patent
Poteat

[19]

[11] Patent Number: 6,059,865
[45] Date of Patent: May 9, 2000

[54] APPARATUS FOR REMOVING ODOR FROM ANIMAL CONFINEMENT BUILDINGS

[75] Inventor: Jere Poteat, Leslie, Mo.

[73] Assignee: Innoventor Engineering, Inc., Chesterfield, Mo.

[21] Appl. No.: 09/002,459

[22] Filed: Jan. 2, 1998

[51] Int. Cl.[7] .......................... B01D 45/10; B01D 47/06; B01D 53/85

[52] U.S. Cl. ................. 96/236; 96/272; 96/273; 96/325; 96/328; 422/120; 422/124

[58] Field of Search ............................ 96/325, 324, 327, 96/328, 236, 237, 272, 273; 95/216, 217, 223, 224, 186, 187, 195, 197, 237; 210/632; 422/120, 124

[56] References Cited

U.S. PATENT DOCUMENTS

| | | | |
|---|---|---|---|
| 1,128,548 | 2/1915 | Sykes | 96/325 |
| 1,474,056 | 11/1923 | Ostermann | 96/325 |
| 1,637,597 | 8/1927 | Ulrici | 96/325 |
| 2,385,077 | 9/1945 | Harker et al. | 96/327 |
| 3,266,224 | 8/1966 | Ferretti | 96/326 |
| 3,500,741 | 3/1970 | Bok | 96/325 |
| 3,733,788 | 5/1973 | Crowley | 96/197 |
| 4,012,209 | 3/1977 | McDowell et al. | 96/325 |
| 4,426,210 | 1/1984 | Drawert et al. | 95/237 |

*Primary Examiner*—David A. Simmons
*Assistant Examiner*—Robert A. Hopkins
*Attorney, Agent, or Firm*—Armstrong Teasdale LLP

[57] ABSTRACT

Apparatus for removing odor from the air exhaust of animal confinement buildings is described. One embodiment of the apparatus includes a plenum housing attached to an existing exhaust fan on an animal confinement building. The plenum housing has an entrance and an exit, and houses a baffle having a roughened surface. Water is delivered to the baffle surface by spray headers which are configured to spray water from a top edge of the baffle. A water curtain is generated by spray nozzles at the plenum housing exit. A trough is configured to collect a water effluent from a bottom edge of the baffle. In use and according to the methods described, an air stream consisting of exhaust air from an animal confinement building is directed toward the water-flooded baffle surface. Odor particles in the air stream impinge on the baffle surface and are adsorbed by the water. The air stream continues to flow past the baffle surface and through the water screen at the plenum housing exit. Additional odor particles and water soluble gases are absorbed and adsorbed by the water screen. Droplets from the water screen fall to the baffle surface and are collected with the effluent. The effluent is drained away directly to a lagoon or to a primary waste water treatment facility for treatment to remove odor particles and gasses.

13 Claims, 3 Drawing Sheets

APPARATUS FOR REMOVING ODOR FROM ANIMAL CONFINEMENT BUILDINGS

FIELD OF THE INVENTION

This invention relates generally to apparatus and methods for removing odor, and more particularly, to apparatus and methods for removing odor from the air exhaust of animal confinement buildings.

BACKGROUND OF THE INVENTION

On large livestock farms, holdings of animal stock are typically maintained within stables or animal confinement buildings. The animals and animal waste inside the buildings generate offensive odors which travel via airborne particles and gases. The odors are typically vented to the outside atmosphere and result in unpleasant conditions for people who live or work in or around the buildings. In particular, such odors are a frequent cause of concern and complaint from neighboring inhabitants. In addition, rising environmental awareness and concerns place increasing pressure on farmers to reduce or eliminate atmospheric pollutants produced by large holdings of livestock. It would be desirable to provide apparatus and methods for eliminating odors from the air exhaust of animal confinement buildings.

Methods to treat atmospheric pollutants in industrial exhaust air are known. One such method is gas-washing, which typically includes the use of washing water treated with lyes, alkalis or phosphates to remove the odor-carrying agents in the air exhaust. Such methods have limited use because the water effluent produced is itself a source of environmental pollution. It would be desirable to provide environmentally sound apparatus and methods for eliminating odors from the air exhaust of animal confinement buildings.

Known methods for removing particles from air exhaust which avoid the use of lyes, alkalis or phosphates include the use of wet-scrubbers. Some of these methods employ the addition of biodegradable, environmentally sound compounds such as partial esters of alcohols or ampholytic compounds. Wet-scrubbers typically employ exchange elements having extensive and complex washing water/air interfaces to facilitate the removal of particulates from the air into the water, and some require heat exchangers and cooling media. The exchange elements used with such methods are expensive to fabricate, expensive to purchase, and also require high energy input to generate turbulence for creating water-air contact. These costs represent a disadvantage for farmers or others who desire methods and apparatus for use on a commercial scale.

Methods and apparatus which employ biological or active carbon filters for removing odors and particles from air exhaust are known. Such methods avoid or limit the production of environmental pollutants and are relatively simple in design. However, filters are also typically expensive to purchase and maintain, and are characterized by high air flow resistance, which make them impractical for use on a commercial scale. It would be desirable to provide apparatus and methods for removing odor from animal confinement buildings which are simple in design, simple to implement, inexpensive to purchase, and have a low energy cost.

SUMMARY OF THE INVENTION

These and other objects may be attained by methods and apparatus for removing odor from animal confinement buildings which, in one embodiment of the apparatus includes a plenum housing which encloses a water-flooded baffle having a roughened surface. The plenum housing is connected to an existing building fan on an animal confinement building. Spray headers connected to a water supply deliver water to a top edge of the baffle, and the water flows over the baffle surface. Spray nozzles connected to a water supply are positioned at the exit of the plenum housing to generate a water screen. The baffle is positioned so that droplets from the water screen fall to the surface of the baffle.

A water effluent is generated from the water which flows over the baffle surface and the effluent adsorbs or absorbs odor particles and water-soluble odorous gases. An ejector ejects an enzyme from an enzyme supply into the water being supplied to the spray headers and spray nozzles. The enzyme neutralizes odor particles collected in the water effluent.

A trough with a waste drain is positioned at a lower edge of the baffle and is configured to collect the effluent from the baffle surface. In one embodiment, the waste drain leads to a settling tank, phase separator, waste gas burner and circulation pump connected in series to form a circuit with, and thereby recirculate water to, the spray headers at the top of the baffle.

One embodiment of the methods employs an existing building exhaust fan to conduct an air stream of air exhaust from an animal confinement building toward a water-flooded surface of a baffle enclosed in a plenum housing. Airborne odor particles impinge upon the water-flooded surface and are captured by adsorption in the water. The air stream, after passing the baffle surface, is then directed through a water screen generated by spray nozzles at the plenum housing exit. Odor-carrying particles and water-soluble gases which remain in the air stream after passing the baffle are captured by adsorption and absorption in the water screen.

Water droplets from the water screen fall to the water-flooded baffle surface and are collected in a trough along with the effluent from the baffle. The effluent is drained from the trough to a settling tank which allows particles to settle out of the water. Solid material formed through the settling process is periodically removed from the tank and may be used as fertilizer. The effluent is passed through a phase separator to separate dissolved gases from the water. Separated gases are then treated with high temperature reduction to remove odor. Water, having the odor particles and dissolved gases removed, is then recirculated to the water supply with a circulation pump.

The methods and apparatus described herein provide simple, low-cost removal of odor from the air exhaust of animal confinement buildings. The apparatus are relatively simple to fabricate and use. In addition, such methods and apparatus require low energy input, are environmentally sound, and operate with an efficiency which makes them cost-effective for use on a commercial scale.

DETAILED DESCRIPTION

Figure 1:
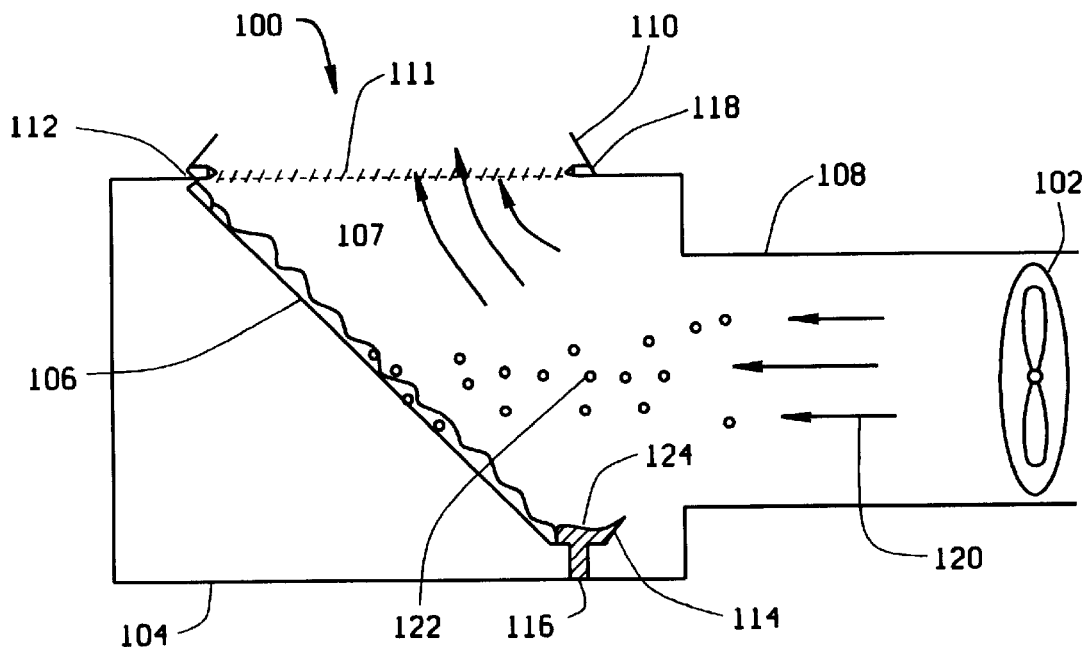
FIG. 1 is a schematic illustration of an apparatus for removing odor from animal confinement buildings.

FIG. 1 is a schematic illustration of an apparatus 100 for removing odor from animal confinement buildings. In this embodiment, a blower shown as an existing fan 102 on an animal confinement building is connected directly to a plenum housing 104. Fan 102 is, for example, a commercially available building exhaust fan having a capacity of about 25,000 cubic feet/minute at ¼ inch water pressure. Of course, the capacity of fan 102 may vary depending on the size of the building. Plenum housing 104 encloses a baffle 106 having a roughened surface 107. Plenum housing 104 has an entrance 108 through which fan 102 directs an air stream. Plenum housing 104 also has an exit 110. Plenum housing 104 is fabricated from a sheet metal such as aluminum, stainless steel, galvanized steel and the like, and baffle 106 is fabricated from sheet metal materials such as aluminum, stainless steel, galvanized steel, and the like. Spray headers 112 are connected to a water supply and are configured to deliver water to a top edge of baffle 106. A collection trough 114 having a waste drain 116 is configured to collect a water effluent 124 from a bottom edge of baffle 106. Spray nozzles 118 at plenum housing exit 110 are connected to the water supply generate a water screen 111.

In use, baffle surface 107 is flooded with water delivered by spray headers 112. Spray nozzles 118 generate a water screen at plenum housing exit 110. Fan 102 imparts velocity to an air stream 120 which bears odor-carrying particles 122 as air stream 120 exits an animal confinement building. Fan 102 is configured to direct air stream 120 toward baffle surface 107 within plenum housing 104. The momentum of the larger of particles 122 causes particles 122 to impinge on surface 107 as air stream 120 flows past surface 107. Particles 122 are captured or adsorbed in water-flooded surface 107. Air stream 120 continues to flow past surface 107, toward plenum housing exit 110 where spray nozzles 118 generate water screen 111. Water-soluble gases, and the smaller of particles 122 which did not have sufficient momentum to impinge on surface 107, are removed by adsorption and absorption in water screen 111. Water droplets from water screen 111 fall to surface 107 and are collected in a water effluent 124 from surface 107 in trough 114. Waste drain 116 allows effluent 124 to be drained for treatment to remove odor-carrying particles and gases.

Figure 2:
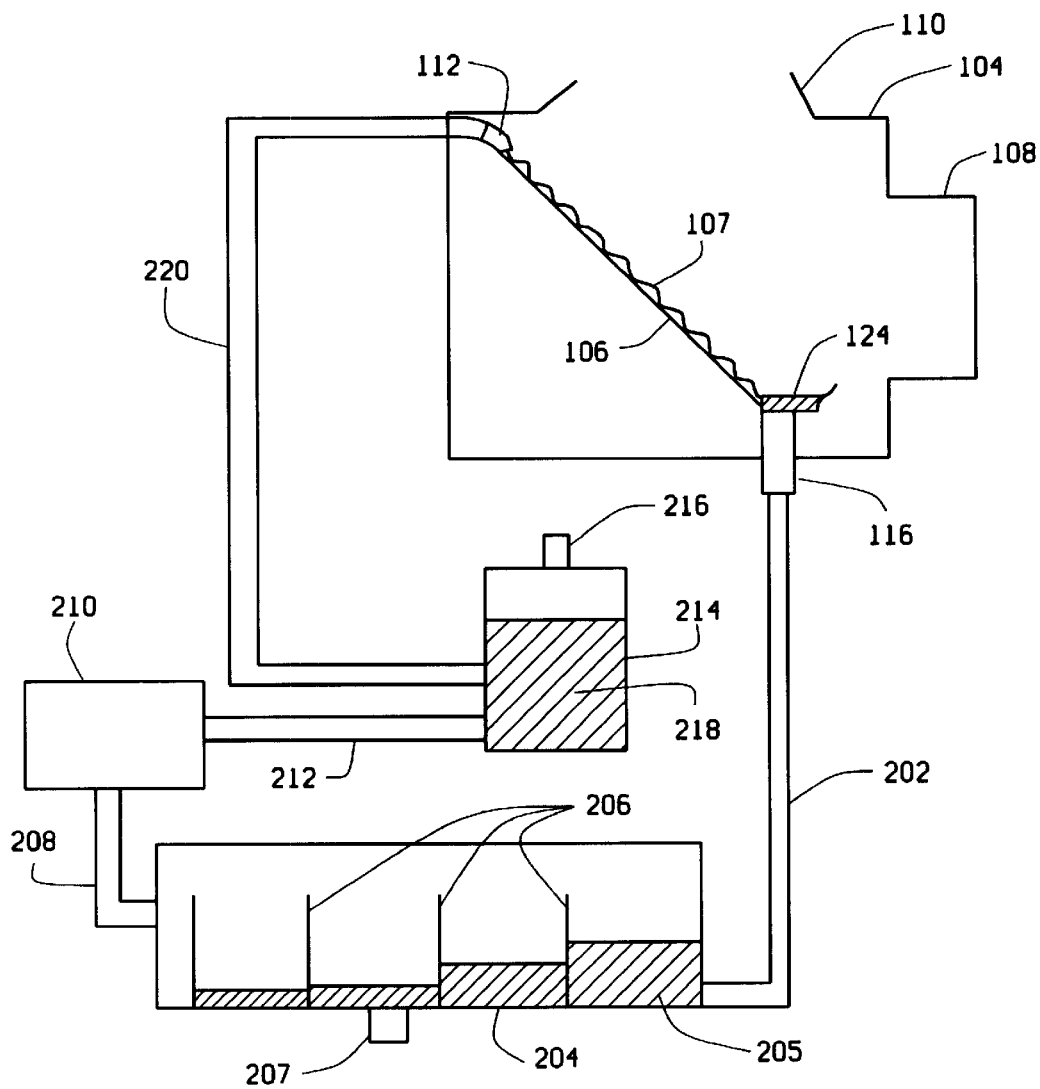
FIG. 2 is a schematic illustration of the apparatus shown in FIG. 1 connected to apparatus for treating a water effluent produced by the apparatus shown in FIG. 1.

FIG. 2 is a schematic illustration of apparatus 100 connected to a series of elements for water treatment and recovery. Treatment and recovery of the water effluent conserves water and avoids the imposition of an additional load on a primary waste water treatment facility. A pipe 202 leads from drain 116 to a settling tank 204. Settling tank 204 contains a series of flow-restricting baffles 206, has a tank drain 207, and an outflow pipe 208 leading to a circulation pump 210. Pipe 212 leads from pump 210 to a phase separator 214 with a waste gas vent 216. A return pipe 220 connects phase separator 214 with the water supply to spray headers 112.

In use, effluent 124 collected in trough 114 drains through drain 116 and passes through pipe 202 to settling tank 204. Solid particles in effluent 124 settle to the bottom of tank 204 and form a material 205 which can be drained through drain 207 and used for fertilizer. Water from tank 204 circulates through pipe 208, pump 210, and pipe 212 to phase separator 214. Separator 214 separates dissolved gases from the water and vents them through vent 216 for further processing as described below. Water continues from separator 214 through pipe 220 back to the water supply for spray headers 112. Pump 210 continuously circulates water between tank 204 and the water supply for spray headers 112 and spray nozzles 118.

Figure 3:
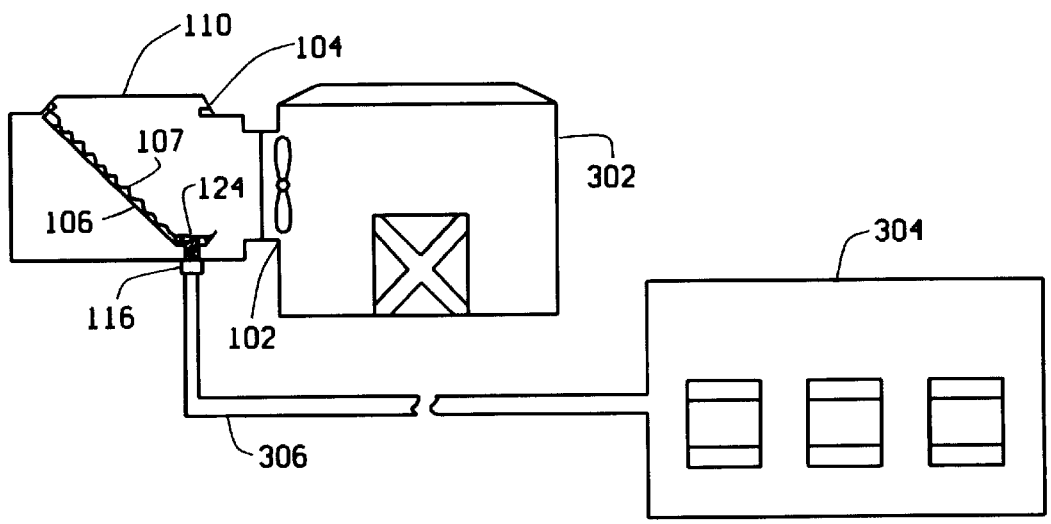
FIG. 3 is a schematic illustration of the apparatus shown in FIG. 1 connected to a primary waste water treatment facility.

FIG. 3 is a schematic illustration of apparatus 100 connected to an animal confinement building 302 and a primary waste water treatment facility 304. Such an arrangement is especially suitable for use when facility 304 can tolerate an additional load and can utilize additional water generated from treatment of effluent 124. In use, exhaust air from building 302 is directed by fan 102 toward baffle surface 107 enclosed in plenum housing 104. Effluent 124 drains to a pipe 306 which leads to facility 304. At facility 304, solid matter and dissolved gases in effluent 124 are removed with processes known to those skilled in the art of water treatment.

Figure 4:
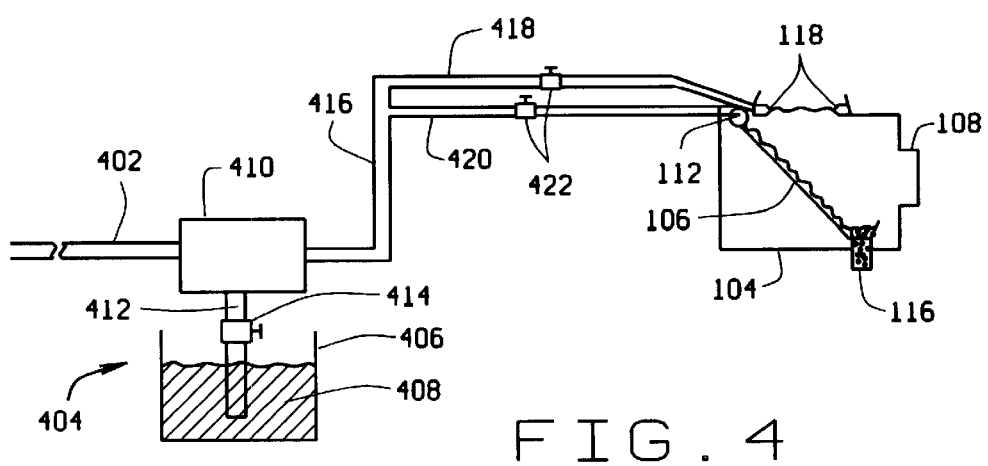
FIG. 4 is a schematic illustration of an enzyme supply connected to the apparatus shown in FIG. 1.
Figure 5:
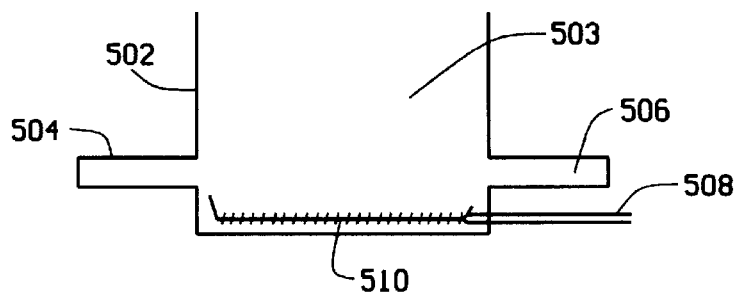
FIG. 5 is a schematic illustration of a gas burner for treating waste gas generated by the apparatus shown in FIG. 1.
Figure 6:
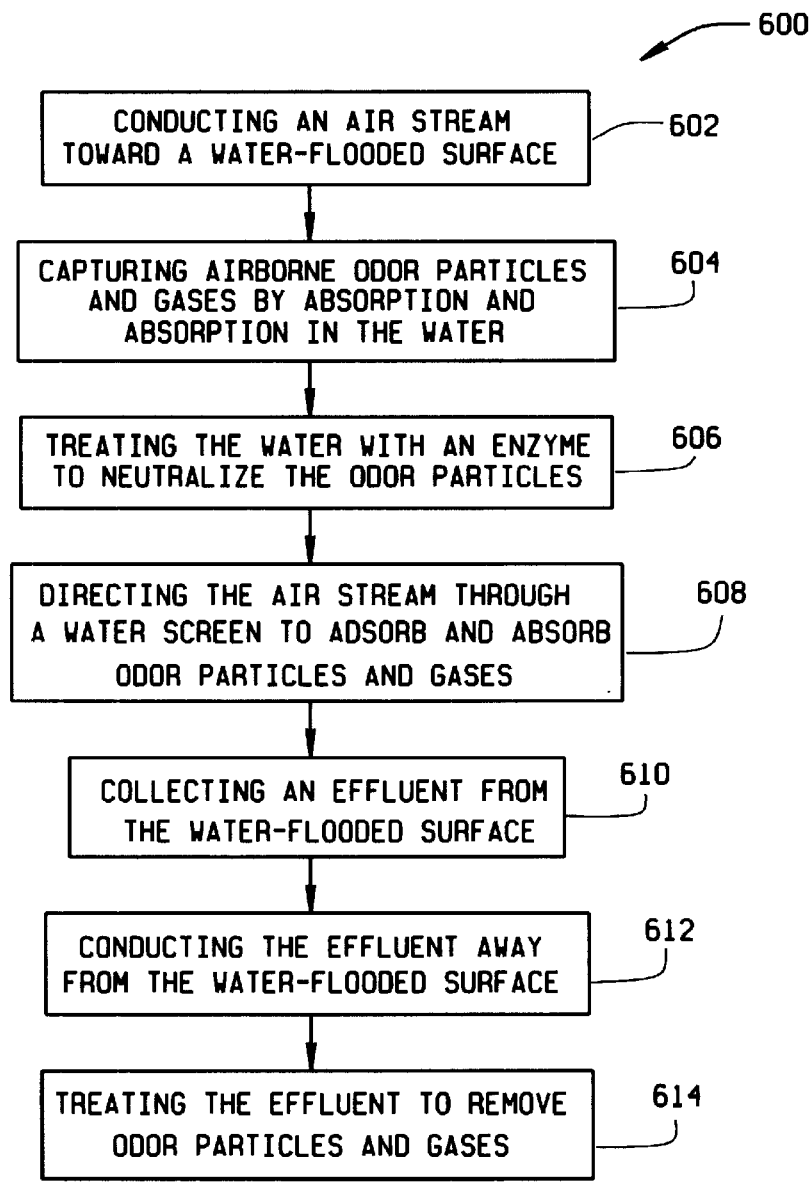
FIG. 6 is a flow chart illustrating the steps of a method for removing odor from animal confinement buildings.

FIG. 4 is a schematic illustration of apparatus 100 connected to a supply pipe 402 leading from a water supply (not shown) to show how an enzyme is delivered to the water supply. An enzyme supply 404 is connected to pipe 402. Enzyme supply 404 consists of a reservoir 406 containing a supply of an enzyme 408, and an enzyme ejector 410. Enzyme 408 is an aqueous solution of any one of a number of suitable enzyme solutions that are commercially available. Typically, Enzyme 408 is at a concentration of about 50% in water, and is maintained at ambient temperatures of about 32° F. to about 110° F. Ejector 410 connects directly to pipe 402 and has a low pressure or suction leg 412 having a metering valve 414. An end of leg 412 is submerged in enzyme 408 and configured to draw enzyme 408 into ejector 412. A pipe 416 leads from ejector 412 to supply pipes 418 and 420 which lead respectively to spray nozzles 118 and spray headers 112. Pipes 418 and 420 each have a control valve 422. In use, valve 414 is set to control a flow of enzyme 408 into ejector 410. The flow is set to obtain a concentration of enzyme in the water of about 10 parts per million (ppm) to about 1000 ppm. Ejector 412 ejects enzyme 408 into water supplied from pipe 402. Water leaving ejector 412 flows through pipe 416 to pipes 418 and 420 which supply water to spray nozzles 118 and spray headers 420. Control valves 422 are used to set the flow of water to about 2 gallons per minute to about 6 gallons per minute.

FIG. 5 is a schematic illustration of a gas reservoir 502 containing a quantity of waste gas 503. Reservoir 502 has a waste gas inlet 504, an air inlet 506, and a fuel inlet 508, and contains a burner 510. In use, waste gas 503 vented from phase separator 214 (shown in FIG. 2) enters reservoir 502 through inlet 504. Gas 503 is subjected to a process of high temperature reduction by mixing by convection with air entering through inlet 506, and gas is then heated with burner 510 to a temperature of about 400° F. to about 1600° F. Burner 510 is fueled with any conventional fuel, for example natural gas, or propane. The process of high temperature reduction reduces odor in gas 503 to unobjectionable levels. Gas 503 may then be vented from reservoir 502 to the atmosphere.

FIG. 6 is a flow chart illustrating the steps of a method 600 for removing odor from animal confinement buildings. Method 600 is practiced at ambient temperatures of about 32° F. to about 110° F. In method 600, an air stream consisting of exhaust from an animal confinement building is directed by a blower, such as a building exhaust fan, toward a water-flooded surface of a baffle 602. The blower directs the air stream and imparts velocity to the air stream so that as the air stream passes over the water-flooded surface. The momentum of some odor particles causes them to impinge on the water-flooded surface where the particles are captured by adsorption 604 in the water while the air stream maintains a smooth flow past the water-flooded surface. Simultaneously, water-soluble gases in the air stream are captured by absorption in the water. The water flowing over the water-flooded surface is treated with an enzyme solution (as described above) to neutralize the odor particles 606. The air stream is then directed through a water screen 608 which captures additional odor particles and water-soluble gases by adsorption and absorption The water supply for the water screen is also treated with an enzyme solution to neutralize odor particles. Water droplets from the water screen fall to the water-flooded surface. Water flowing over the water-flooded surface toward a lower edge of the baffle is collected 610 as an effluent in a trough, and conducted 612 away from the surface via a trough drain and pipes. Pipes carry the effluent to a primary waste water treatment facility where the effluent is treated 614 to remove odor particles and dissolved gases using processes known to those skilled in the art of water treatment.

Those skilled in the art will recognize alternative embodiments of the apparatus described herein. For example, plenum housing 104 may instead be a duct, conduit or other chamber having an entrance and exit. Plenum housing 104 may be connected to fan 102 with a duct instead of directly to fan 102. Fan 102 may instead be any existing blower or exhaust fan on the confinement building, and trough 114 may be a channel, gutter or funnel. Alternatively, trough 114 may be absent, thereby allowing water effluent to flow directly off baffle surface 107 and out of an opening in plenum housing 104. The roughened surface 107 of baffle 106 may consist of diamond plate, corrugation, or other raised or textured patterns. Alternatively, surface 107 may be smooth. Spray nozzles 118 may be altogether absent, or may be positioned instead at the plenum housing entrance 108 to generate a water screen through which the air stream passes before passing toward baffle 106. Alternatively, spray nozzles 118 may be positioned at both the plenum housing entrance 108 and exit 110, thereby generating two water screens. Spray headers 112 may be positioned along sides of baffle 106, or along both sides and top of baffle 106.

Alternative embodiments of the methods will also be recognized by those skilled in the art. The methods may be applied in situations other than animal confinement where simple, inexpensive odor removal from exhaust air is desired. In situations where no existing fan or blower is available, a fan or blower may be integrated with the apparatus, for example by attachment at the plenum housing entrance 108. Step 608, directing the air stream through a water screen, may be eliminated or alternatively may be practiced before step 604, or both before and after step 604. Step 606, treating the water with an enzyme to neutralize the odor particles, may be eliminated. Steps 612 and 614 may be combined into a single step of conducting the effluent to a lagoon or other body of water with sufficient capacity to bear the volume of effluent. Alternatively, step 614 may be practiced with water treatment and recovery apparatus as described in FIG. 2.

The apparatus and methods described herein provide simple and inexpensive means for removal of odor from the exhaust air of animal confinement buildings. The apparatus are inexpensive to fabricate and purchase, and can utilize existing building exhaust fans. The methods avoid the use of polluting agents, and do not require complex exchange elements or heating and cooling devices. In addition, the apparatus and methods do not require high energy input and operate with an efficiency which render them cost-effective for commercial applications.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

I claim:

1. Apparatus for removing odor from air exhaust from a building, said apparatus comprising:

a plenum housing having a first opening for inflow of the airstream, a second opening for outflow of the airstream, and a bottom opening therethrough;

a baffle enclosed by said plenum housing, said baffle comprising a surface positioned at an oblique angle relative tc the air inflow, said surface having a lower edge;

a water supply coupled to said baffle for providing water flowing over said surface, said water generating a water effluent at said surface lower edge; and an enzyme supply reservoir, said enzyme supply reservoir comprising:
   an enzyme ejector including a suction leg; and
   a valve meter connecting said enzyme ejector to said water supply.

2. An apparatus in accordance with claim 1 wherein said baffle surface comprises a smooth surface.

3. An apparatus in accordance with claim 1 wherein said baffle surface comprises a roughened surface.

4. An apparatus in accordance with claim 1 further comprising a spray header connected to said water supply, said spray header configured to spray water onto said baffle surface.

5. An apparatus in accordance with claim 4 wherein said spray header is configured to spray water on a top edge of said surface.

6. An apparatus in accordance with claim 1 further comprising water treatment means for treating the water effluent, said water treatment means connected to said water collection means.

7. An apparatus in accordance with claim 6 wherein said water treatment means comprises a primary waste water treatment facility.

8. An apparatus in accordance with claim 6 wherein said water treatment means comprises:

a settling tank comprising a drain;

a circulation pump connected to said settling tank drain;

a phase separator comprising a waste gas vent, said phase separator connected to said circulation pump; and a waste gas burner connected to said phase separator.

9. Apparatus in accordance with claim 1 further comprising an exhaust fan coupled to said plenum housing.

10. Apparatus in accordance with claim 9 wherein said exhaust fan is coupled to a building.

11. Apparatus in accordance with claim 1 wherein a plurality of spray nozzles generate a water screen across at least one of said first opening and said second opening.

12. Apparatus in accordance with claim 1 wherein a plurality of spray nozzles generate a water screen across said first opening and said second opening.

13. Apparatus in accordance with claim 1 further comprising:

a trough enclosed by said plenum housing and positioned at said surface lower edge for collecting said water effluent, said trough having a drain opening therethrough; and a drain connecting said drain opening with said plenum rousing bottom opening.

* * * * *